United States Patent
Kato

(10) Patent No.: US 9,067,194 B2
(45) Date of Patent: Jun. 30, 2015

(54) METHOD OF REGENERATING USED CATALYST

(75) Inventor: Yasuyoshi Kato, Hiroshima (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 136 days.

(21) Appl. No.: 12/442,997

(22) PCT Filed: Jun. 26, 2008

(86) PCT No.: PCT/JP2008/061633
§ 371 (c)(1),
(2), (4) Date: May 27, 2009

(87) PCT Pub. No.: WO2009/001891
PCT Pub. Date: Dec. 31, 2008

(65) Prior Publication Data
US 2010/0093517 A1    Apr. 15, 2010

(30) Foreign Application Priority Data
Jun. 27, 2007 (JP) .................................. 2007-168546

(51) Int. Cl.
| | |
|---|---|
| *B01J 21/20* | (2006.01) |
| *B01J 23/28* | (2006.01) |
| *B01J 23/30* | (2006.01) |
| *B01D 53/86* | (2006.01) |
| *B01J 23/92* | (2006.01) |
| *B01J 38/48* | (2006.01) |
| *B01J 38/60* | (2006.01) |

(52) U.S. Cl.
CPC ............. *B01J 21/20* (2013.01); *B01D 53/8628* (2013.01); *B01D 2255/20707* (2013.01); *B01D 2255/20723* (2013.01); *B01D 2255/20769* (2013.01); *B01D 2255/20776* (2013.01); *B01D 2257/404* (2013.01); *B01J 23/28* (2013.01); *B01J 23/30* (2013.01); *B01J 23/92* (2013.01); *B01J 38/485* (2013.01); *B01J 38/60* (2013.01)

(58) Field of Classification Search
None
See application file for complete search history.

(56) References Cited

U.S. PATENT DOCUMENTS 7,569,506 B2 * 8/2009 Foerster .......................... 502/27

FOREIGN PATENT DOCUMENTS

| JP | 54-51991 | 4/1979 |
|---|---|---|
| JP | 60-209252 | 10/1985 |
| JP | 2000/308832 | 11/2000 |
| JP | 2004-109355 | 4/2004 |
| JP | 2004 195420 | 7/2004 |
| JP | 2004-267897 | 9/2004 |
| JP | 2004-267946 | 9/2004 |
| JP | 2004-298760 | 10/2004 |
| JP | 2006-505386 | 2/2006 |
| WO | WO 2004/222226 | 3/2004 |

OTHER PUBLICATIONS

International Search Report for International application No. PCT/JP2008/061633.

* cited by examiner

*Primary Examiner* — Sarah A Slifka
(74) *Attorney, Agent, or Firm* — Fay Sharpe LLP

(57) ABSTRACT

[Problem] Provided is a method for regenerating a catalyst, the method decreasing the $SO_2$ oxidation rate, which has been increased by Fe and V compounds, of a spent denitration catalyst to an extremely low level, and improves the oxidation activity of the catalyst for metal mercury by the regeneration treatment.

[Solving Means] A method for regenerating a catalyst, including steps of immersing a spent denitration catalyst composed mainly of titanium oxide in (a) a mixed aqueous solution containing phosphate ions and oxo-acid ions of one or more elements selected from vanadium (V), molybdenum (Mo), and tungsten (W), (b) a heteropoly acid compound aqueous solution containing phosphorus and one or more elements selected from V, M, and W, or (c) a mixed aqueous solution containing a phosphate compound and a vanadyl compound, and then drying the catalyst.

7 Claims, No Drawings

METHOD OF REGENERATING USED CATALYST

TECHNICAL FIELD

The present invention relates to a method for regenerating a spent catalyst composed mainly of titanium oxide, specifically to a method for regenerating a spent denitration catalyst so as to decrease the sulfur dioxide ($SO_2$) oxidation activity of the catalyst which has been increased by the adhesion of iron oxide and the like, and to impart a high activity for the oxidation of metal mercury to the catalyst.

BACKGROUND ART

In recent years, with the increase in interest in conservation of global environment and effective utilization of resources, recycle and reuse have been promoted in the field of industrial products. Also for flue gas denitration catalysts, various attempts at recycle and reuse have been made through, for example, a method for reusing a degraded spent catalyst after cleaning the catalyst with any chemical agents, or a method for recovering useful elements from a spent catalyst.

Catalysts composed of titanium oxide carrying active components such as vanadium (V), molybdenum (Mo), or tungsten (W) oxides have been widely used as flue gas denitration catalysts. Their degradation is caused by, for example, the deterioration of the denitration activity due to the adhesion of dust components derived from the gas, for example, alkali metal elements such as potassium and sodium, alkaline earth metal elements such as calcium, and volatile compounds such as arsenic, lead, and phosphorus, the inactivation of the denitration catalytic site due to the crystal growth of titanium dioxide ($TiO_2$) and active components by heat, and the sulfatization of the active component upon reaction with SOx. In order to solve these degradation problems, various regeneration methods have been studied and invented.

Denitration catalysts are disabled by the above-described degradation, as well as the increase of the $SO_2$ oxidation activity of the catalyst due to the adhesion of V and iron (Fe) compounds, which are derived from the waste gases, on the catalyst surface, or the migration of Fe ions into the catalyst caused by the corrosion of the metal substrate. When $SO_2$ contained in waste gases is oxidized to $SO_3$ at a high ratio, or the $SO_2$ oxidation rate is high, the amount of an acidic ammonium sulfate deposit in the air preheater, which is located in the downstream part, increases to cause the increase of the pressure loss, or $SO_3$ is emitted in the form of $SO_2$ through a chimney to cause violet smoking or secondary nuisance. It is thus preferred that the catalyst be replaced upon the detection of the increased $SO_2$ oxidation rate, before the deterioration of the denitration activity. In recent years, mainly in the United States, flue gas denitration devices have been increasingly installed in boilers for burning low rank coal containing large amounts of S and Fe components. As a result of this, more catalysts are replaced upon the increase of the $SO_2$ oxidation rate caused by the adhesion of the Fe component. Therefore, there is a strong demand for the development of a method for regenerating spent catalysts through effective decrease of the increased $SO_2$ oxidation rate of the catalyst.

In addition to the demand to decrease the $SO_2$ oxidation rate of denitration catalysts, also increasingly demanded is an increase of the oxidation activity of denitration catalysts for metal mercury. In recent years, in the United States and European countries, tightened regulations are imposed on the emission of trace components contained in waste gases emitted from thermal power plants. In particular, the emission of mercury (Hg) must be limited to an extremely low level, because it adversely affects the growth of infantile brain and nerves. In order to prevent the emission of mercury, much attention is paid to a method including steps of oxidizing metal mercury having a high vapor pressure with a denitration catalyst to a mercury compound having a low vapor pressure, and then recovering the mercury compound. Under the circumstances, there is an increasing demand for an advanced catalyst regeneration technique which decreases the $SO_2$ oxidation rate, as well as improves the Hg oxidation activity of the catalyst.

Known methods for regenerating denitration catalysts are aimed at spent denitration catalysts which have been used in denitration devices for waste gases produced by burning of high rank coal containing small amounts of Fe and S components. Therefore, many of them are intended mainly to recover the denitration capability. The main purpose of these methods is not to recover the denitration activity for decreasing the $SO_2$ oxidation rate. Examples of known methods for regenerating spent denitration catalysts include a method including steps of immersing a spent denitration catalyst in an aqueous solution of a molybdenum compound such as molybdenum trioxide, or an aqueous solution containing an ammonium salt of oxalic acid or tungstic acid, and then drying the catalyst (Patent Documents 1 and 2).

Patent Document 1: Japanese Patent Application Laid-Open No. 2004-298760
Patent Document 2: Japanese Patent Application Laid-Open No. 2004-267897

However, 3000 ppm or more of $SO_2$ is contained in waste gases emitted from boilers burning high-S coal such as eastern coal in the U.S.A., so that more than 30 ppm of $SO_3$ is emitted even though the $SO_2$ oxidation rate is 1%. Regeneration of a catalyst used in such a boiler requires effective decrease of the increased $SO_2$ oxidation rate to an extremely low level. Therefore, the recovery of the denitration activity is relegated to the second place, or slight deterioration of the denitration activity may be accepted.

DISCLOSURE OF INVENTION

Problems to be Solved by the Invention

In consideration of the above-described demand for the regeneration method required for the denitration of waste gases from high-S coal burning boilers, an object of the present invention is to provide a method for regenerating a spent denitration catalyst, the method decreasing the $SO_2$ oxidation rate, which has been increased by Fe and V compounds, of the spent denitration catalyst to an extremely low level, and improves the oxidation activity of the catalyst for metal mercury.

Means for Solving the Problem

In order to solve the above-described problems, the present invention includes the following aspects.
(1) A method for regenerating a catalyst, including steps of immersing a spent denitration catalyst composed mainly of titanium oxide in a phosphate ion-containing aqueous solution, and then drying the catalyst.
(2) A method for regenerating a catalyst, including steps of immersing a spent denitration catalyst composed mainly of titanium oxide in (a) a mixed aqueous solution containing phosphate ions and oxo-acid ions of one or more elements selected from vanadium (V), molybdenum (Mo), and tungsten (W), (b) a heteropoly acid compound aqueous solution containing phosphorus and one or more elements selected from V, Mo, and W, or (c) a mixed aqueous solution containing a phosphate compound and a vanadyl compound, and then drying the catalyst.

(3) A method for regenerating a catalyst, including steps of cleaning a spent catalyst composed mainly of titanium oxide with an aqueous solution containing an organic acid or a mineral acid, and then treating the catalyst by the method according to (1) or (2).

(4) A method for regenerating a catalyst, including steps of treating a spent denitration catalyst composed mainly of titanium oxide ($TiO_2$) by the method according to (1) or (2), and then immersing the catalyst in a slurry containing a catalytic component composed of $TiO_2$ and oxide(s) of one or more elements selected from V, Mo, and W thereby forming a new catalytic component layer on the surface of the spent catalyst.

(5) A method for regenerating a catalyst, including steps of cleaning a spent catalyst composed mainly of titanium oxide with an aqueous solution containing an organic acid or a mineral acid, treating the catalyst by the method according to (1) or (2), and then immersing the catalyst in a slurry containing a catalytic component composed of $TiO_2$ and oxide(s) of one or more elements selected from V, Mo, and W thereby forming a new catalytic component layer on the surface of the spent catalyst.

(6) The method for regenerating a catalyst according to (2), wherein the mixed aqueous solution (a) contains phosphoric acid or its ammonium salt and a compound expressed by a rational formula $(NH_4)_3Mo_2V_3O_{15}$, and the mixed aqueous solution (c) contains phosphoric acid and vanadyl sulfate.

As a result of various studies to achieve the decrease of a high $SO_2$ oxidation activity of a spent denitration catalyst, the maintenance or improvement of the denitration activity of the catalyst, and the remarkable improvement of the mercury oxidation activity, the inventors have found that various phosphate compounds have the following properties, and thus have made the present invention utilizing these properties.

(i) Iron phosphate or its analogues formed by the reaction between Fe compounds derived from a metal support, which are leading causes of the increase of the $SO_2$ oxidation rate, and a phosphate ion-containing solution hardly influence the $SO_2$ oxidation activity, denitration activity, and mercury oxidation activity of the catalyst, and thus can be regarded as inactive substances.

(ii) Compounds formed by the reaction between the catalytic components such as V, Mo, and W and phosphate ions have little $SO_2$ oxidation activity, but maintain a moderate denitration activity and a high mercury oxidation activity.

Accordingly, as described in (1), the $SO_2$ oxidation activities of Fe and V are completely deactivated by having the spent catalyst to carry the phosphate ion-containing solution. As a result of this, although the denitration activity slightly deteriorates, the regenerated catalyst has little $SO_2$ oxidation activity while maintaining a high mercury oxidation activity.

Further, as described in (2), when the spent catalyst carries the mixed solution containing V, Mo, and/or W compounds and phosphoric acid or a phosphate, the Fe and V attached to the catalyst are inactivated, which results in the decrease of the $SO_2$ oxidation activity of the catalyst. In addition, the catalyst carries the compound composed of phosphate ions and V, Mo, and/or W, which has a denitration activity and a high mercury oxidation activity, thereby exhibiting markedly improved denitration and mercury oxidation activities.

According to the method of the present invention, a phosphate ion-containing solution such as a phosphoric acid or phosphate aqueous solution is carried by the spent catalyst thereby allowing the phosphate ions to react with the Fe and V deposits attached to or generated on the catalyst. Therefore, if the amounts of the deposits are too much, it may be difficult to have the catalyst to carry phosphate ions necessary for the reaction. Further, if most pores of the catalyst are clogged, the catalyst may be hardly capable of carrying the solution. In such cases, as described in (3), the effect of the phosphate ions can be effectively achieved by cleaning the catalyst with an aqueous solution containing an organic acid such as oxalic acid or a mineral acid such as nitric acid thereby removing deposits, or by recovering the pore volume, and then carrying out the operation described in (1) or (2).

The phosphate ions carried by the catalyst react with Fe and V compounds, as well as are strongly adsorbed to $TiO_2$, so that they are scarcely eluted after drying. Therefore, after the treatments described in (1) to (3), as described in (4), a highly active catalytic component layer is formed on the catalyst surface by a so-called wash coating process including immersing the catalyst in a slurry containing dispersed catalytic component particles. The catalytic component layer thus formed effectively compensates for the denitration activity or mercury oxidation activity of the catalyst, thus regenerating the spent catalyst to a catalyst exhibiting excellent denitration and mercury oxidizing capabilities and a low $SO_2$ oxidation rate.

Further, as described in (6), the combination of a phosphate ion-containing compound and a vanadyl compound or the above-described specific Mo—V compound produces a solution containing these compounds at an arbitrary ratio and high concentrations, thereby providing a regenerated catalyst having an intended composition by a single immersion operation. Under the method, little precipitate is formed in the treatment solution, so that the remnant solution can be reused for another immersion operation. This is advantageous from the standpoint of cost saving.

Of special note is that, unless the amount of the deposit on the catalyst is too much, the regeneration method of the present invention includes only steps of immersion or wash coating to impregnate the catalyst with a phosphate ion containing solution, and then drying the catalyst. Therefore, the method does not basically require cleaning operation which can produce a large amount of waste water. The method allows on-site regeneration without requiring wastewater treatment, and markedly reduces the cost of wastewater treatment.

Advantageous Effect of the Invention

According to the present invention, the $SO_2$ oxidation activity of a denitration catalyst, which has been increased by the adhesion of Fe and V, or corrosion of the metal substrate of the catalyst, is markedly decreased. In particular, the method allows the regeneration of spent catalysts used for the denitration of waste gases from high-S coal burning boilers, which requires low $SO_2$ oxidation rate and is used mainly in the United States. In addition, the addition of the V compound formed by the reaction with phosphate ions, which has a low $SO_2$ oxidation activity and a high Hg oxidation activity, increases the Hg oxidation activity so as to exceed that of a new catalyst while keeping the $SO_2$ oxidation rate low.

BEST MODE FOR CARRYING OUT THE INVENTION

In the present invention, the phosphate ion-containing solution may be an aqueous solution of orthophosphoric acid, condensed phosphoric acid, or a salt thereof such as an ammonium salt. Since salts with strong bases are poorly soluble and poorly reactive, acid solutions are preferred to give a good result. However, as is evident from the scope of the present invention, phosphate ions may be formed in the environment in which the catalyst is treated, and phosphate ions are not necessary to be present in the solution when it is carried by the catalyst. Therefore, phosphoric acid or perphosphoric acid may be used to make the solution.

In the present invention, the solution containing oxo-acid ions of one or more elements selected from V, Mo, and W refers to an aqueous solution containing oxo-acid ions such as vanadate ions, molybdate ions, tungstate ions, and condensates thereof, and is prepared by dissolving a corresponding oxo-acid or its salt in water. In usual cases, ammonium salts give good results. Vanadic acid or its salt is poorly soluble, so that a solution of a highly soluble vanadyl compound such as vanadyl sulfate or vanadyl oxalate gives a better result. Alternatively, the solution may be a single compound solution prepared by dissolving a heteropoly acid formed by condensation of an oxo-acid of P with another oxo-acid of one or more elements selected from V, Mo and W.

The amount of phosphate ions carried by the catalyst is usually from 0.1 to 10% by weight with reference to the amount of $V_2O_5$ in the catalyst, though it depends on the amount of the deposit of Fe and V. If the amount of the phosphate ions is too small, their inhibitory effect on $SO_2$ oxidation is low, and if too much, they may cause pore clogging. A range from 1 to 8% by weight tends to give a good result.

The amount of the active component carried together with phosphate ions is more than 0 and 20% or less by weight in terms of a corresponding oxide thereof, and usually 10% or less to give a good result. When the amount of the carried active component is too much, in a like manner as phosphate ions, the active component causes pore clogging to deteriorate the denitration activity and mercury oxidation activity.

In the third aspect of the present invention, the step of cleaning the spent catalyst composed mainly of titanium oxide with an aqueous solution containing an organic acid or a mineral acid is intended to recover the pores which have been clogged as described above, and requires no stringent treatment. Although the method to be used depends on the component clogging the pores, according to a usual method, the catalyst is immersed in an aqueous solution containing 1 to 20% by weight of an organic acid such as oxalic acid or citric acid, or a mineral acid such as nitric acid or sulfuric acid thereby cleaning the catalyst for several minutes to several hours. Cleaning with oxalic acid or nitric acid gives a good result, because they dissolve various metal oxides and calcium sulfate.

In the fourth aspect of the present invention, the conditions for preparing the catalytic component to obtain the catalyst slurry are not particularly limited. However, a Ti/Mo/V catalyst or a Ti/W/V catalyst obtained by a known catalyst preparation method tends to give a good result. In the catalyst, the content of Mo or W oxide is preferably from 1 to 10 atom %, and the content of V is preferably from 1 to 10 atom %. In particular, the V content is preferably 3 to 7 atom % to achieve a high activity even when the thickness of the coating layer is small. According to the scope of the present invention, it is obvious that the catalyst slurry may contain a compound containing phosphate ions.

It is easy to prepare a stable mixed solution of a compound containing phosphate ions (oxo-acid ions of phosphorus) and an oxo-acid compound of Mo or W, because they will not form a precipitate after mixing. On the other hand, a V compound tends to react with phosphate ions to form a precipitate. In order to minimize the discharge of waste water, what is important is to obtain a stable mixed solution containing a V compound and phosphate ions having high activities for nitration and metal mercury oxidation, and to have the catalyst carry the solution through immersion treatment. For that purpose, the combination of compounds according to the sixth aspect of the present invention gives a good result. In order to achieve this, the combination of the compound expressed by the rational formula $(NH_4)_3Mo_2V_3O_{15}$ (Japanese Patent Application Laid-Open No. 2000-308832, Japanese Patent No. 3765942), which is invented by the inventors, or a vanadyl compound such as vanadyl sulfate or vanadyl oxalate with phosphoric acid or ammonium phosphate is preferred because it readily gives a concentrated solution having an optional composition using a common industrial reagent.

EXAMPLES

The present invention is further described in detail with reference to specific examples.

Preparation of Catalyst to be Regenerated

The spent catalyst subjected to the regeneration test is a plate catalyst composing of a composition carried by a substrate having a thickness of 0.7 mm, the composition including a catalytic component composed of titanium oxide ($TiO_2$), tungsten oxide ($WO_3$), and vanadium oxide ($V_2O_5$) at a Ti/W/V atomic ratio of 95.5/5/0.5, 15% by weight (with reference to the catalytic component) of silica alumina-based inorganic fibers, and 8% by weight of $SiO_2$ as a binder, the substrate being made by subjecting a SUS430 steel sheet having a thickness of 0.2 mm to metal lathing, the plate catalyst having been used for the denitration treatment in a boiler burning eastern coal for about two years. The catalyst is herein referred to as a catalyst I to be regenerated.

Another spent catalyst subjected to the regeneration test is a plate catalyst composing of a composition carried by a substrate having a thickness of 0.7 mm, the composition including a catalytic component composed of titanium oxide ($TiO_2$), molybdenum oxide ($MoO_3$), and vanadium oxide ($V_2O_5$) at a Ti/W/V atomic ratio of 94/5/1, 15% by weight (with reference to the catalytic component) of silica alumina-based inorganic fibers, and 8% by weight of $SiO_2$ as a binder, the substrate being made by subjecting a SUS430 steel sheet having a thickness of 0.2 mm to metal lathing, the plate catalyst having been used for the denitration treatment in a boiler burning petroleum coke and eastern coal for about two years. The catalyst is herein referred to as a catalyst II to be regenerated.

The contaminants attached to the surface of these catalysts were analyzed by X-ray fluorometry, and main substances were compared between samples before and after the regeneration test. In addition, test pieces with a size of 20×100 mm were cut out from the catalysts, and subjected to the measurements of the denitration capability, $SO_2$ oxidation rate, and mercury oxidation rate of the catalysts under the conditions listed in Tables 1 to 3. The results obtained before and after the regeneration test are summarized in Table 4.

Examples 1 and 2

Water was added to 13 g and 26 g portions of 85% by weight phosphoric acid to make each of them 100 g, respectively, thus preparing solutions for making the catalysts to carry phosphoric acid.

The catalyst I to be regenerated was cut into pieces having a size of 100×100 mm, the pieces were immersed in the above-described solutions, and then dried at 120° C. to obtain regenerated catalysts. The amount of phosphoric acid carried by the catalysts was 4% and 8% by weight, in terms of $P_2O_5$.

Examples 3 and 4

The catalyst II to be regenerated was treated in the same manner as in Examples 1 and 2.

Comparative Examples 1 and 2

Catalysts of comparative examples were obtained in the same manner as in Examples 1 and 3, except that the phosphoric acid used in the regeneration test was changed to pure water.

Example 5

A regenerated catalyst was obtained in the same manner as in Example 1, except that the phosphoric acid was changed to ammonium dihydrogen phosphate.

Example 6

A solution containing a compound expressed by the rational formula $(NH_4)_3Mo_2V_3O_{15}$ was prepared by the method disclosed in Japanese Patent Application Laid-Open No. 2000-308832, to which phosphoric acid and water were added to make a solution containing 10% by weight of phosphoric acid and 10% by weight of $(NH_4)_3Mo_2V_3O_{15}$. The catalyst I to be regenerated was immersed in the solution, drained, and dried at 120° C. to obtain a regenerated catalyst.

Example 7

A regenerated catalyst was obtained in the same manner as in Example 6, except that the solution used herein had been prepared by dissolving 12 g of 85% by weight phosphoric acid and 8 g of vanadyl sulfate in 80 g of water.

Example 8

A regenerated catalyst was obtained in the same manner as in Example 6, except that the solution used herein had been prepared by dissolving 6 g of 85% by weight phosphoric acid and 10 g of ammonium molybdate in 84 g of water.

Comparative Examples 3 to 5

Catalysts of comparative examples were obtained in the same manner as in Examples 6 to 8, except that the phosphoric acid was changed to pure water.

Example 9

The catalyst I to be regenerated was cut into a piece having a size of 100×100 mm. The piece was immersed in 200 ml of a 5% oxalic acid solution warmed at 60° C., cleaned for 1 hour while occasionally shaking, and then dried at 120° C. The cleaned catalyst was immersed in a solution containing 6% by weight of phosphoric acid and 7.5% by weight of $(NH_4)_3Mo_2V_3O_{15}$, which had been prepared in the same manner as in Example 6, and then dried at 120° C. to obtain a regenerated catalyst.

Comparative Example 6

The cleaning treatment in Example 9 was carried out alone, thus obtaining a catalyst of comparative example.

Comparative Example 7

A catalyst of comparative example was obtained in the same manner as in Example 9, except that the cleaned catalyst was immersed in a solution containing 7.5% by weight of $(NH_4)Mo_2V_3O_{15}$.

Example 10

To 20 kg of titanium oxide powder, added were 2.48 kg of ammonium molybdate $((NH_4)_6.Mo_7O_{24}.4H_2O)$, 1.97 kg of ammonium metavanadate, and 3.0 kg of oxalic acid, and water in an amount to give a solid content of 34%. The mixture was kneaded with a kneader, and the resultant paste was formed into columns having a diameter of 3 mmφ. The columns were dried with a fluidized-bed dryer, calcined at 500° C. for 2 hours, and then ground with a hammer mill to obtain a catalyst powder containing 50% or more of 1 μm or less particles (V content: 6 atom %). To 3 kg of the powder, added were 3 kg of silica sol ($SiO_2$ content 20%) and 6 kg of water, and the mixture was stirred to make a slurry for coating.

The regenerated catalyst obtained in Example 1 was immersed in the slurry, perpendicularly lifted up to drain, and dried in the air for 1 hour, and subsequently at 120° C. for 1 hour to obtain the regenerated catalyst of the present invention.

Test Example

The catalysts of Examples 1 to 10, and Comparative Examples 1 to 7 were subjected to the measurements of the denitration ratio, $SO_2$ oxidation rate, and Hg oxidation activity under the conditions listed in Tables 1 to 3. The results are summarized in Table 5.

As is evident from the comparison between Examples 1 to 5 and Comparative Examples 1 and 2, the catalysts regenerated by the method of the present invention kept a high denitration activity and a high Hg oxidation rate while exhibiting an extremely low $SO_2$ oxidation rate. The comparison between Examples 6 to 10, in which phosphate ions and catalytic components were carried, and Comparative Examples 3 to 5 and 7, in which catalytic components were carried alone, indicates that the regeneration method of the present invention markedly improves the denitration capability and Hg oxidation rate while keeping a low $SO_2$ oxidation rate.

Under the method of Comparative Example 6, which corresponds to a conventional regeneration method using chemical cleaning, the $SO_2$ oxidation rate of the catalyst decreased to a degree, but its denitration capability and Hg oxidation rate were extremely low. Under the method of Comparative Example 7, which corresponds to a combination of chemical cleaning and carrying of an active component, the denitration capability and mercury oxidation rate of the catalyst were high, but its $SO_2$ oxidation rate also markedly increased.

As described above, the method of the present invention for regenerating a spent catalyst markedly decreases its $SO_2$ oxidation rate, as well as regenerates the spent catalyst to have a high denitration capability and a high Hg oxidizing capability, thereby turning out to be an excellent method.

TABLE 1

| Evaluation item | Value |
|---|---|
| 1. Gas composition | |
| NOx | 200 ppm |
| NH₃ | 240 ppm |
| SO₂ | 500 ppm |
| O₂ | 3% |
| CO₂ | 12% |
| H₂O | 12% |
| 2. Gas flow rate | 3 liter/minute |
| 3. Temperature | 350° C. |
| 4. Catalyst loading | 20 mm (width) × 100 mm (total length) – 1 sheet |

TABLE 2

| Evaluation item | Value |
|---|---|
| 1. Composition | |
| SO₂ | 500 ppm |
| O₂ | 3% |
| 2. Gas flow rate | 1.2 liter/minute |
| 3. Temperature | 380° C. |
| 4. Catalyst loading | 20 mm (width) × 100 mm (total length) – 3 sheets |

TABLE 3

| Evaluation item | Value |
|---|---|
| 1. Gas composition | |
| NOx | 300 ppm |
| NH₃ | 300 ppm |
| SO₂ | 1000 ppm |
| O₂ | 3% |
| CO₂ | 12% |
| H₂O | 12% |
| Hg | 10 ng/ |
| HCl | 30 ppm |
| 2. Gas flow rate | 3 liter/minute |
| 3. Temperature | 350° C. |
| 4. Catalyst loading | 20 mm (width) × 100 mm (total length) – 3 sheets |

TABLE 4

| Name | State | Major adherents on catalyst surface (wt %) | | | | Performance (%) | | |
|---|---|---|---|---|---|---|---|---|
| | | Fe₂O₃ | V₂O₅ | CaO | As₂O₃ | SO₂ oxidation rate | Denitration rate | Hg oxidation rate |
| Catalyst I to be regenerated | Initial state | 0.1 | 0.7 | — | — | 0.6 | 62 | 55 |
| | After use | 4.3 | 0.4 | 3.1 | 2.9 | 4.3 | 54 | 45 |
| Catalyst II to be regenerated | Initial state | 0.1 | 1.4 | — | — | 1.1 | 68 | 63 |
| | After use | 1.8 | 3.7 | 2.2 | 1.2 | 5.4 | 73 | 72 |

TABLE 5

| Example | Spent catalyst | Treatment | Catalyst capability (%) | | |
|---|---|---|---|---|---|
| | | | SO₂ oxidation rate | Denitration rate | Hg oxidation rate |
| Example 1 | Catalyst I to be regenerated | Immersion in 11% phosphoric acid | 0.6 | 54 | 46 |
| Example 2 | Catalyst I to be regenerated | Immersion in 22% phosphoric acid | 0.5 | 53 | 43 |
| Example 3 | Catalyst II to be regenerated | Immersion in 11% phosphoric acid | 1.1 | 63 | 61 |
| Example 4 | Catalyst II to be regenerated | Immersion in 22% phosphoric acid | 0.7 | 59 | 58 |
| Example 5 | Catalyst I to be regenerated | Immersion in 13% ammonium dihydrogen phosphate | 0.9 | 55 | 46 |
| Example 6 | Catalyst I to be regenerated | Immersion in 10% phosphoric acid + 10% Mo—V compound | 0.9 | 63 | 79 |
| Example 7 | Catalyst I to be regenerated | Immersion in 10% phosphoric acid + 8% vanadyl sulfate | 0.8 | 60 | 78 |

TABLE 5-continued

| Example | Spent catalyst | Treatment | Catalyst capability (%) | | |
|---|---|---|---|---|---|
| | | | $SO_2$ oxidation rate | Denitration rate | Hg oxidation rate |
| Example 8 | Catalyst I to be regenerated | Immersion in 5% phosphoric acid + 10% ammonium molybdate | 1.1 | 56 | 55 |
| Example 9 | Catalyst I to be regenerated | Washing with 5% oxalic acid followed by immersion in 6% phosphoric acid + 7.5% Mo—V compound | 0.7 | 64 | 79 |
| Example 10 | Catalyst I to be regenerated | Example 1 + catalyst coating | 1.2 | 71 | 80 |
| Comparative Example 1 | Catalyst I to be regenerated | Immersion in pure water | 6.1 | 55 | 44 |
| Comparative Example 2 | Catalyst II to be regenerated | Immersion in pure water | 4.9 | 72 | 69 |
| Comparative Example 3 | Catalyst I to be regenerated | Immersion in 10% Mo—V compound | 8.2 | 67 | 81 |
| Comparative Example 4 | Catalyst I to be regenerate | Immersion in 8% vanadyl sulfate | 6.2 | 69 | 77 |
| Comparative Example 5 | Catalyst I to be regenerate | Immersion in 10% ammonium molybdate | 5.7 | 59 | 56 |
| Comparative Example 6 | Catalyst I to be regenerate | Washing with 5% oxalic acid alone | 2.1 | 33 | 35 |
| Comparative Example 7 | Catalyst I to be regenerate | Washing with 5% oxalic acid + immersion in 10% Mo—V compound | 5.3 | 74 | 83 |

The invention claimed is:

1. A method for regenerating a catalyst, consisting of the steps of:
    impregnating a spent denitration catalyst composed mainly of titanium oxide and contaminated by iron compounds with a phosphoric acid aqueous solution so as to react the iron compounds on the catalyst with the phosphoric acid to form an iron phosphate and allow on-site regeneration of the catalyst without requiring any cleaning operation of the catalyst, and
    then drying the catalyst.

2. The method for regenerating a catalyst according to claim 1, wherein the concentration of the phosphate ion in the phosphate ion-containing aqueous solution is 5% by weight or more based on the weight of the aqueous solution.

3. The method for regenerating a catalyst according to claim 1, wherein the phosphate ion-containing aqueous solution is a phosphoric acid aqueous solution.

4. A method for regenerating a catalyst, consisting of the steps of:
    impregnating a spent denitration catalyst composed mainly of titanium oxide and contaminated by iron compounds in
        (a) a mixed aqueous solution containing phosphoric acid and oxo-acid ions of one or more elements selected from vanadium (V), molybdenum (Mo), and tungsten (W), or
        (b) a heteropoly acid compound aqueous solution containing phosphorus and one or more elements selected from V, Mo, and W, or
        (c) a mixed aqueous solution containing a phosphoric acid and a vanadyl compound so as to react the iron compounds on the catalyst with the phosphoric acid to form an iron phosphate and allow on-site regeneration of the catalyst without requiring any cleaning operation of the catalyst, and
    then drying the catalyst.

5. The method for regenerating a catalyst according to claim 4, wherein the catalyst is impregnated in the mixed aqueous solution (a); and wherein the mixed aqueous solution (a) contains phosphoric acid or its ammonium salt and a compound expressed by a rational formula $(NH_4)_3Mo_2V_3O_{15}$.

6. The method for regenerating a catalyst according to claim 4, wherein the catalyst comprises $V_2O_5$; and wherein the phosphate ion carried by the catalyst is from about 1 to about 8% by weight based on the weight of $V_2O_5$ in the catalyst.

7. The method for regenerating a catalyst according to claim 4, wherein the catalyst is impregnated with the mixed aqueous solution (c); and wherein the mixed aqueous solution (c) contains phosphoric acid and vanadyl sulfate.

* * * * *